Jan. 6, 1953     C. P. MOLYNEUX     2,624,422
LUBRICATING SYSTEM FOR INTERNAL-COMBUSTION ENGINES
AND FILTER STRUCTURE FOR USE THEREIN
Original Filed Oct. 4, 1947
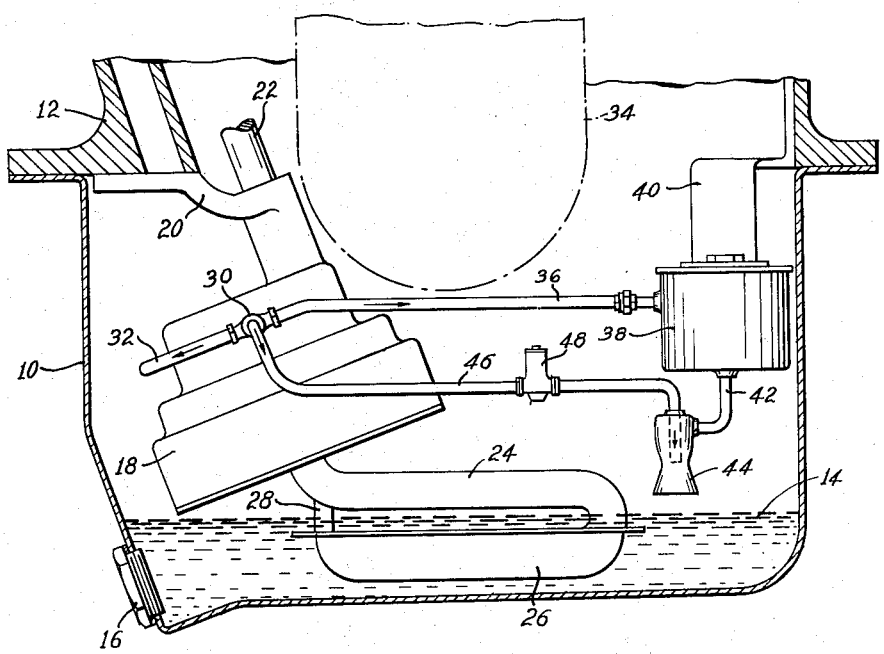
INVENTOR.
CECIL P. MOLYNEUX
BY
ATTORNEYS Patented Jan. 6, 1953

2,624,422

UNITED STATES PATENT OFFICE 2,624,422

LUBRICATING SYSTEM FOR INTERNAL-COMBUSTION ENGINES AND FILTER STRUCTURE FOR USE THEREIN

Cecil Patrick Molyneux, Southampton, N. Y., assignor to Filtors, Incorporated, Long Island City, N. Y., a corporation of New York Continuation of application Serial No. 777,965, October 4, 1947. This application October 24, 1952, Serial No. 316,722

12 Claims. (Cl. 184—6)

This invention relates to improvements in oil filtering systems for internal combustion engines, and particularly engines of the automotive type in which an oil filter is provided for purifying the oil in the crank case of the engine.

This application is a continuation of application Serial No. 777,965, filed October 4, 1947, and now abandoned, for Lubricating System for Internal Combustion Engines.

Most internal combustion engines are provided with a lubricating system which includes a pump operatively connected to the engine mechanism and driven thereby. In general, this pump is used to draw oil from the engine crank case or oil container and distribute it to the parts of the engine to be lubricated. A filter is also used in many systems and oil to be purified is passed thereto from the lubricating oil pump.

One of the difficulties of previously known systems is the failure to provide means for passing a sufficient proportion of the oil through the filter. Some difficulty resides in the fact that there is a considerable resistance to the flow of oil through most filters and therefore a considerably lower amount of oil is filtered than is desired.

In accordance with the features of the present invention it has been found that a relatively simple arrangement will materially increase the oil flow through the filter at the pump pressure normally used and consequently produce a greater purification by the removal of a greater amount of sludge and carbon from the oil.

An important object of the invention is therefore to provide an improved oil filtering system for internal combustion engines which will largely avoid the difficulties pointed out above.

An important feature of the invention comprises an improved oil filtering system of the type referred to in which lubricating oil at the oil pump pressure is supplied to the filter, and excess oil delivered by the pump is utilized in a Venturi ejector means at the outlet of the filter for applying suction thereto and thereby increasing the amount of oil passed through the filter.

Another feature of the invention is to provide an engine lubricating system including an oil filter which will be simple in construction and automatic in operation. While in some internal combustion engines it may be possible for an operator to make certain adjustments of valves and other control means in filter systems so as to secure improved filtration, it is not generally possible or practicable to provide an automobile engine, for example, with various valve controls, since the wrong valves may be turned and they for the most part would never be utilized by the ordinary automobile owner or operator. The automatic arrangement of the present invention is therefore adapted to provide a simple and inexpensive system associated with the automobile lubricant pump, and which will greatly improve the filtration of the oil.

The improved system of the present invention includes other features which will be described in detail hereinafter in connection with the accompanying drawing forming a part of this application.

In the drawings:

Fig. 1 is a broken vertical sectional view, somewhat in diagrammatic form, showing the improved filtering system in connection with the crank case of an automobile internal combustion engine.

Fig. 2 is an enlarged approximately horizontal sectional view showing the direct mounting of a filter on a crank case of an automobile.

The apparatus shown in Fig. 1 includes a crank case 10 for an internal combustion engine shown partly at 12. The crank case contains a body of lubricating oil 14 and is provided with the usual drainage plug 16. The oil pump for the engine is mounted in the crank case and shown at 18 as being carried on a bracket 20 attached to the engine block proper. The pump is driven from the engine by a drive shaft 22 in a conventional manner. The oil of the body 14 is supplied to the pump through a duct 24 which connects with a conventional type of oil strainer 26. The duct 24 connects with the strainer at the right while the strainer is braced with respect to the duct by a member 28 at its left end.

The oil taken up by the pump 18 is delivered into a four-way connection 30 from which oil is conducted through a line 32 at the pressure maintained in the system to the parts of the engine to be lubricated, such for example as the crank shaft and piston mechanism indicated diagrammatically at 34. A portion of the excess oil from the pump 18 is supplied through a line 36 to a filter 38 supported in the crank case by a bracket 40, filtered oil being discharged through a pipe 42 into the casing of an ejector 44 mounted above the body of oil, and then to the body of oil 14 in the crank case. Any type of ejector or eductor may be employed for applying a suction through the pipe 42 to the filter 38. The oil for operating the ejector 44 is supplied by the pump 18 through a line 46 having a pressure relief valve 48 therein. The line 46 extends axially into the ejector 44 to provide a stream of oil, at about pump pressure, at a restricted part of the ejector casing so as to pick up the oil from the filter and apply a suction to the filter. Where a conventional ejector or eductor having the structure shown is employed, the lines 42 and 46 will merely be connected to the proper intakes of the ejector. The oil from the line 46, together with that drawn from the filter, passes into the body of oil in the crank case.

In the operation of the apparatus, the pump 18 operates when the internal combustion engine is running to pick up oil from the oil body 14 and supply it through the line 32 to lubricate the engine. A part of the excess oil passes through the line 36 and through the filter, from which it is returned to the body of oil in the crank case. The valve 48 in the line 46 is set to maintain a predetermined maximum pressure in the lubricating system of the engine, and the valve setting therefore determines the pressure of the oil delivered by the pump. The pump in the normal engine of course supplies considerably more oil than is necessary and more oil than can be passed through the filter at the maximum pressure. The pressure relief or pressure control valve 48 therefore opens to permit oil to flow through the line 46 and into the ejector 44. The action of the ejector applies suction to the outlet of the filter through the line 42 thereby increasing the pressure drop through the filter and the capacity of the filter, so that more oil is purified than otherwise would be possible.

The ejector 44 also has the effect of balancing the operation since an increase in flow through the filter 38 will naturally tend to decrease the flow through the line 46.

The valve 48 is preferably a spring-loaded valve which will operate automatically and open to give gradually increasing flow as the pressure rises in the neighborhood of the set maximum pressure. The pump 18 is advantageously of a sufficient capacity to supply the engine lubricating system and the filter, and to also provide for a substantially continuous flow through the relief valve 48 to the ejector 44, so as to materially increase the flow through the filter 38. The valve 48 may be set at 15 p. s. i. or higher, depending upon the system, and the pressure in the line 46 at the ejector will be only slightly lower. When the system is arranged to operate in this manner a relatively small filter, which may be provided with the usual oil filtering materials, will maintain the oil in the crank case in a high state of purification and freedom from sludge and carbon.

In the modified form of construction shown in Fig. 2, a filter unit is mounted directly on the outside of the engine block so that it may be quickly attached or replaced. The filter unit is advantageously mounted on the side of the engine block in a convenient position so that certain passageways in the filter unit match up with passageways provided in the wall of the engine block. As shown, the engine block wall 12a is provided with three passageways approximately in horizontal line. The apparatus includes a pumping arrangement similar to that shown in Fig. 1. In Fig. 2 the pump outlet line 36a is connected by threading for example, into a passageway 50 in the wall 12a, while the pipe 46a leading from the relief valve in the system is similarly connected into a passageway 52. The wall 12a also includes a third relatively larger passageway 54, which in the present construction comprises a part of the ejector.

The filter unit attached to the wall 12a advantageously comprises a cast filter casing 56 integral with a supporting arm section 58 having a flange 59 fitting the side wall 12a and containing tubular passageways matching two of those in the wall 12a. I have found it advantageous to cast the filter unit as an integral aluminum casting ready to receive the filter element which is mounted around the perforated or slotted outlet tube 60, of conventional construction. A gasket as shown may be provided between the flat face of the flange 59 and the wall 12a, and the filter unit may be secured to the wall by means of three or more stud bolts 62. The unit includes a passageway 36b for conducting oil under pressure from the line 36a into the filter casing 56, the passage 36b terminating with a projecting short tube 64 which fits into the passageway 50. The filter unit also includes an outlet passageway 42a which leads from the outlet 60 through the section 58, flange 59 and a projecting tube 66 which extends axially into the passageway 54 in the wall 12a.

The flange 59 of the filter unit includes a relatively large laterally extending passageway 68 which is open in the face of the flange which is mounted against the wall 12a. This passageway 68 provides a communication between the pasageway 52 in the wall 12a and the passageway 54, and extends entirely around, with its side wall spaced from the projecting tube 66 which is mounted substantially axially in the passageway 54.

The operation of the modified form of apparatus shown in Fig. 2 is essentially the same as that described above in connection with Fig. 1, the oil at pump pressure being delivered through the pipe 36a and the passageway 36b to the filter casing 56, while the oil passed from the filter enters the tubular outlet 60 and flows through passageway 42a and its tubular extension 66, through the wall 12a and pours into the crank case of the engine. The oil released through the pressure relief valve such as 48, flows through the line 46a, passageways 52 and 68, around the outlet tube 66 and through passageway 54 to apply a suction to the passageway 42a. The length and diameter of the projecting tube 66 is controlled with respect to the passageway 54 so as to provide an effective ejector when the unit is installed on an engine in the manner shown.

The improved apparatus of the present invention is particularly adapted for use in connection with engines having relatively low pressure oil systems of, for example, 15 pounds per square inch. At such pressures it has been extremely difficult to secure proper filtering of the oil because of the low throughput obtained. The apparatus of the present invention includes an ejector which supplies suction to the filter outlet and thereby greatly increases the oil throughput for the filter. The form of invention shown in Fig. 2 is particularly adapted for such engines, and is provided for direct mounting of the filter unit on the engine block or crank case.

From the foregoing description it will be understood that certain changes may be made in the construction and arrangement of the various parts, for example the pressure control valve and ejector may be combined or adjacent each other. Other changes may be made and at the same time achieve the objects and advantages of the present invention. The system as shown and described comprises a relatively simple arrangement which is free of control valves in the lines 32, 36, 36a, 42 and 42a, with only a set pressure relief valve in the line 46 or 46a. The average automobile owner or operator therefore has nothing to adjust or control in securing effective purification of the lubricating oil for his engine.

What I claim as new is:

1. In a lubricating system for internal combustion engines, including a crank case for retaining a body of lubricating oil, a pump for drawing oil from the body of oil in the crank case and for supplying oil to the parts of the engine to be lubricated, and a filter for purifying the lubricating oil in the system, the improvement which comprises means for passing a portion of the oil from the pump through the parts of the engine to be lubricated, means for passing another portion of the oil from the pump to the filter, an outlet conduit for the filter for conducting oil from the filter to the crank case, an ejector associated with said conduit for applying a suction to the outlet of the filter, and an oil line leading from the outlet of the pump having a pressure relief valve therein for maintaining a predetermined pressure on the oil from the pump, said oil line being connected into the ejector beyond the valve and arranged to supply oil under pressure to operate the ejector thereby increasing the flow of oil through the filter over that which would normally be possible.

2. In a system for filtering lubricating oil for internal combustion engines, including a container for retaining the body of lubricating oil, a pump for drawing oil from the body of oil in the container and for supplying oil to the parts of the engine to be lubricated, and a filter for purifying the lubricating oil in the system, the improvement which comprises means for passing a portion of the oil from the pump through the parts of the engine to be lubricated, means for passing another portion of the oil from the pump to the filter, an outlet conduit for the filter for conducting oil from the filter to the container, an ejector associated with said conduit for applying a suction to the outlet of the filter, means for controlling the pressure on the oil delivered by the pump, and an oil line leading from the outlet of the pump and connected into said ejector to supply oil under pressure to operate the ejector, thereby increasing the flow of oil through the filter over that which would normally be possible.

3. In a lubricating system for an internal combustion engine including a crank case for retaining a body of oil, a pump in said crank case arranged to draw oil from said crank case and to deliver oil under pressure to the parts of the engine to be lubricated, a filter for filtering the oil in the lubricating system, the improvement which comprises an unobstructed oil line connected into the pump and extending to the inlet of the filter, an unobstructed oil line leading from the filter to the crank case and having an ejector associated therewith, said ejector being arranged to apply a suction to the filter through the oil line leading therefrom, an oil line connected into the outlet of the pump extending to the ejector and arranged to supply liquid under pressure from the pump to the ejector for applying suction to the filter, and an automatic pressure relief valve in the line leading from the pump to the ejector for maintaining a substantial predetermined maximum pressure in the lines leading from the pump outlet.

4. In a lubricating oil filtering system for an internal combustion engine including a container for retaining a body of oil, a pump arranged to draw oil from said container and to deliver oil under pressure to the parts of the engine to be lubricated, a filter for filtering the oil in the system, the improvement which comprises an unobstructed oil line connected into the pump outlet and extending to the inlet of the filter, an unobstructed oil line leading from the filter to the container and having an ejector associated therewith, said ejector being arranged when operated to apply a suction to the filter through the oil line leading therefrom, an oil line connected into the outlet of the pump and extending to the ejector and arranged to supply oil under pressure from the pump to the ejector for applying suction to the filter, and means for maintaining a substantial predetermined maximum pressure in the lines leading from the pump outlet.

5. A lubricating oil filter system as defined by claim 4 in which the filter is mounted directly on the engine wall and in which the ejector comprises a passageway in the engine wall surrounding the end of the outlet line from the filter.

6. In a lubricating oil system for an internal combustion engine including a container for retaining a body of oil, a pump to draw oil from said container and to deliver oil under pressure to the parts of the engine to be lubricated, a filter unit mounted on the outside of the engine wall for filtering the oil in the system, the improvement which comprises an unobstructed oil line connected into the pump outlet and extending to the engine wall adjacent the filter unit, a passageway in the wall and filter unit leading from said line to the filter, an unobstructed oil passageway leading from the filter to the engine wall and terminating in a tubular outlet projecting into a passageway in the engine wall, said passageway being substantially larger than said tubular outlet, a second oil line connected into the outlet of the pump and extending to the engine wall and opening through a passageway therein adjacent to said last-mentioned passageway, and a passageway in the filter unit adjacent the engine wall connecting the said last-mentioned passageways, whereby oil delivered by said second oil line is directed around the said projecting outlet to apply suction to the filter.

7. A lubricating oil filter system as defined in claim 6 in which said second oil line includes an automatic pressure relief valve.

8. In a lubricating oil filtering system for an internal combustion engine including a container for retaining a body of oil, a pump to draw oil from said container and to deliver oil under pressure to the parts of the engine to be lubricated, an oil filter having a mounting flange with a face thereof secured in sealed relation to the outside of the engine wall, the improvement which comprises an unobstructed oil supply line connected into the pump outlet and extending to the engine wall opposite the flange of the filter, a passageway through the engine wall and filter flange leading from said oil supply line into the filter, a second passageway through the engine wall facing said flange, an unobstructed oil discharge passageway leading from the filter through the flange to the engine wall and terminating in a tubular outlet projecting into said second passageway in the engine wall, said second passageway being substantially larger than said projecting tubular outlet, a second oil line connected into the outlet of the pump and extending to the engine wall and opening through a third passageway therein adjacent to said second passageway, and a passageway in the flange of the filter adjacent the engine wall connecting the said second and third passageways, whereby oil delivered by said second oil line is directed around the said projecting tubular outlet to apply suction thereto and to the filter.

9. A lubricating oil filtering system as claimed in claim 8 in which said second oil line includes an automatic pressure relief valve.

10. In a lubricating oil filtering system for internal combustion engines which include a container for retaining a body of oil, a pump to draw oil from said container and deliver oil under pressure to the parts of the engine to be lubricated, a pair of oil supply lines connected into the pump outlet and extending to a side wall of the engine, a pair of passageways through said side wall adjacent to each other and into which said supply lines are connected, and a third passageway through said engine wall adjacent to said pair of passageways for the flow of oil into said container, the improvement which comprises an oil filter having a mounting flange mounted on the outside of the engine wall over all said passageways with a face of said flange secured in sealed relation to the outside of the engine wall, a conduit in the body of said flange connected into one of said pair of passageways and leading into the filter to supply oil under pressure thereinto, and a second conduit in the body of said flange leading from the filter and connected into said third passageway for conducting filtered oil from the filter through said third passageway into said container, said flange having a passageway therein connected into the other of said pair of passageways and into said third passageway.

11. In a lubricating oil filtering system for an internal combustion engine of the type having a block including a crank case provided with an outlet passageway for oil under pressure and an adjacent inlet passageway for oil to be delivered to the crank case of the engine, a filter unit including a casing carried by an arm, a flange on the arm having a surface fitting the outer surface of the engine block and attached thereto at the position of said outlet and inlet passageways, passageways extending through said flange and arm into said filter casing connecting said outlet and inlet passageways respectively for the flow of oil under pressure from the engine into said filter casing and the flow of filtered oil from said filter casing into the crank case of the engine, the passageway for the flow of oil from the filter casing including a tubular member extending from the attachment face of the flange into the inlet passageway in the engine block, said tubular member having an outside diameter smaller than that of said inlet passageway in the block so that oil may flow around said tubular member, the attachment face of the flange being provided with a recess extending around said tubular member, and means for conducting oil from the engine into said recess, whereby oil is caused to flow through the recess into the inlet passageway in the block around said tubular member, thereby increasing the flow of oil from the filter unit through said tubular member.

12. A filter unit for attachment to the block of an internal combustion engine for filtering the engine oil comprising a casing, a mounting flange on which the casing is carried, said flange having an attachment face adapted to fit the surface of the engine block to which the filter unit is to be attached, a recess in said attachment face, a first passageway for conducting oil from the engine into said casing, said first passageway having an inlet opening through said attachment face outside said recess, and a second passageway for conducting filtered oil from said casing back to the engine, said second passageway terminating at its discharge end in a projection extending into said recess in spaced relation to its side walls.

CECIL PATRICK MOLYNEUX.

No references cited.